(12) United States Patent
Vaishnavi et al.

(10) Patent No.: US 11,570,054 B2
(45) Date of Patent: Jan. 31, 2023

(54) DEVICE AND METHOD FOR PROVIDING CONTROL PLANE/USER PLANE ANALYTICS (71) Applicant: Huawei Technologies Co., Ltd., Shenzhen (CN)

(72) Inventors: Ishan Vaishnavi, Munich (DE); Clarissa Marquezan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/375,904

(22) Filed: Jul. 14, 2021

(65) Prior Publication Data
US 2021/0344570 A1    Nov. 4, 2021

Related U.S. Application Data

(63) Continuation of application No. PCT/EP2019/050918, filed on Jan. 15, 2019.

(51) Int. Cl.
*G06F 15/173* (2006.01)
*H04L 41/14* (2022.01)
*H04L 47/70* (2022.01)

(52) U.S. Cl.
CPC ............. *H04L 41/14* (2013.01); *H04L 47/82* (2013.01)

(58) Field of Classification Search
CPC ...... H04L 41/14; H04L 47/82; H04L 41/0816
USPC ................................. 709/224, 223, 225, 226
See application file for complete search history.

(56) References Cited

U.S. PATENT DOCUMENTS

| | | | |
|---|---|---|---|
| 8,959,633 B1* | 2/2015 | Dokey | H04L 63/1408 726/22 |
| 11,026,106 B2* | 6/2021 | Bor-Yaliniz | H04W 24/04 |
| 2015/0023207 A1* | 1/2015 | Lan | H04L 45/308 370/254 |

(Continued)

FOREIGN PATENT DOCUMENTS

| CN | 106489260 A | 3/2017 |
|---|---|---|
| CN | 108023749 A | 5/2018 |

(Continued)

OTHER PUBLICATIONS

"3rd Generation Partnership Project; Technical Specification Group Services and System Aspects; Policy and Charging Control Framework for the 5G System; Stage 2 (Release 15)," 3GPP TS 23.503 V15.0.0, pp. 1-56, 3rd Generation Partnership Project, Valbonne, France (Dec. 2017).

(Continued)

*Primary Examiner* — Lan Dai T Truong
(74) *Attorney, Agent, or Firm* — Leydig, Voit & Mayer, Ltd.

(57) ABSTRACT

The present application provides a device for providing control plane (CP) and/or user plane (UP) analytics. The device is configured to obtain information related to a resource and/or a change of a resource related to a CP and/or a UP; perform an analysis based on the obtained information; and generate data based on the analysis. This application also provides a management plane entity, for example, an operation, administration and management (OAM). The management plane entity is configured to provide information related to a resource, wherein the resource is related to a CP and/or a UP to the device for providing analytics.

12 Claims, 10 Drawing Sheets

(56) References Cited

U.S. PATENT DOCUMENTS

| | | | |
|---|---|---|---|
| 2015/0382209 A1 | 12/2015 | Sanneck et al. | |
| 2016/0330083 A1* | 11/2016 | Djukic | H04L 12/1492 |
| 2018/0316564 A1 | 11/2018 | Senarath | |
| 2020/0007413 A1* | 1/2020 | Kerpez | H04L 12/4641 |
| 2020/0100137 A1* | 3/2020 | Panchai | H04L 43/20 |
| 2020/0196155 A1* | 6/2020 | Bogineni | H04L 41/0823 |
| 2020/0287929 A1* | 9/2020 | Biever, Jr | G06F 21/6245 |

FOREIGN PATENT DOCUMENTS

| | | |
|---|---|---|
| CN | 109155909 A | 1/2019 |
| WO | 2018007405 A1 | 1/2018 |

OTHER PUBLICATIONS

"3rd Generation Partnership Project; Technical Specification Group Services and System Aspects;" Management and orchestration; Provisioning; (Release 16)," 3GPP TS 28.531 V16.0.0, pp. 1-64, 3rd Generation Partnership Project, Valbonne, France (Dec. 2018).

"3rd Generation Partnership Project; Technical Specification Group Services and System Aspects; Management and orchestration; Generic management services; (Release 15)," 3GPP TS 28.532 V15.1.0, pp. 1-162, 3rd Generation Partnership Project, Valbonne, France (Dec. 2018).

"3rd Generation Partnership Project; Technical Specification Group Core Network and Terminals; 5G System; Network Function Repository Services; Stage 3 (Release 15)," 3GPP TS 29.510 V15.2.0, pp. 1-107, 3rd Generation Partnership Project, Valbonne, France (Dec. 2018).

"3rd Generation Partnership Project; Technical Specification Group Services and System Aspects; Telecommunication Management; Management and orchestration of networks and network slicing; 5G Core Network (5GC) Network Resource Model (NRM); Stage 2 and stage 3 (Release 15)," 3GPP TS 28.543 V1.0 0, pp. 1-42, 3rd Generation Partnership Project, Valbonne, France (Jun. 2018).

"3rd Generation Partnership Project; Technical Specification Group Services and System Aspects; Study of Enablers or Network Automation for 5G (Release 16)," 3GPP TR 23.791 V16.0.0, pp. 1-121, 3rd Generation Partnership Project, Valbonne, France (Dec. 2018).

* cited by examiner

DEVICE AND METHOD FOR PROVIDING CONTROL PLANE/USER PLANE ANALYTICS

CROSS-REFERENCE TO RELATED APPLICATIONS

This application is a continuation of International Application No. PCT/EP2019/050918, filed on Jan. 15, 2019, the disclosure of which is hereby incorporated by reference in its entirety.

FIELD

The present application relates generally to the field of mobile communication, and particularly, to devices and methods for exposing management plane information. In this filed, the application proposes a device and a method for providing control plane/user plane analytics. This application also proposes a management plane entity that provides information to the device for providing the analytics.

BACKGROUND

In the conventional 3rd Generation Partnership Project (3GPP), the Network Data Analytics Function (NWDAF) performs analytics of the Control Plane (CP)/User Plane (UP) entities. The CP/UP entities may be any network function service or link in the CP or the UP. However, the analytics function may be influenced by, for example, the resource on which those planes are running, the links/interconnections between the CP/UP entities, etc. In addition, the Operation, Administration and Management (OAM) may perform changes in the CP/UP entities, such as a relocation of the Network Functions (NFs), scaling up and down the number of the CP and the UP NFs, changing the hosting resource, changing the links/inter-connections between the CP/UP entities, etc. Furthermore, the resource information may be available at the OAM level. Therefore, if the OAM changes the resources that the CP/UP NF is placed on, the NWDAF analytics of the NF may be influenced. However, if the NWDAF doesn't have this information, then, the analytics information that it provides may be incorrect, for example, in the case that the OAM changes the resources used to host the virtual NFs.

Figure 8:
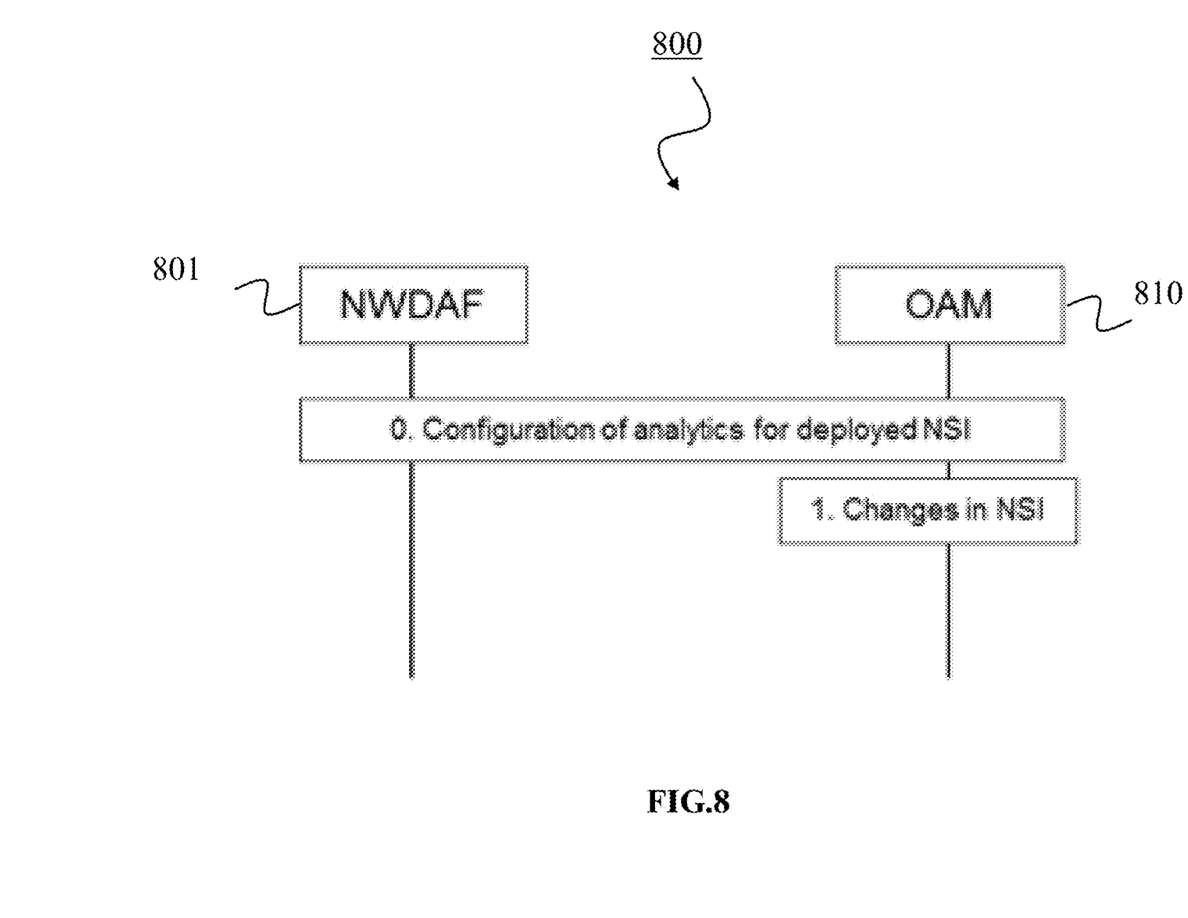
FIG. 8 schematically illustrates a conventional procedure for performing a change in the resource.

FIG. 8 schematically illustrate a conventional procedure 800 in which at the first step (step 0), the OAM 810 configures the NWDAF 801 for analytics for a deployed NSI. Moreover, at the second step (step 1) the OAM 810 performs changes in the NSI.

The prior art is based on the ongoing conventional works. For example, according to the TS 28.531/TS28.532 (Provisioning Services, Management Data or Management Capability), the OAM Provisioning services does not expose information and changes of that information in the Network Slice Instance (NSI), the network slice subnet instance (NSSI), NFs, network, etc.

Moreover, according to the TS 29.510, the NF Profile is defined such that it can be queried at the NF Repository Function (NRF) at the CP. For example, the NF locality is a parameter describing the NF, but restricted to the geographical location of the NF. The locality is a high level information and not in-depth implementation detail that may be relevant to the NWDAF. In addition, no explicit definition is provided for how the OAM changes are reflected in the NF profile.

SUMMARY

In view of the above-mentioned problems and disadvantages, the present application improves the conventional devices and their methods for providing the Control Plane (CP) and/or the User Plane (UP) analytics. In particular, the present application provides a device and a method to enhance and/or enable management decisions, performed by the OAM affecting the analytics generation, to be propagated to the Analytics Function (AF) at the control plane.

The present application is implemented by the solution provided in the enclosed independent claims. Advantageous implementations of the present application are further defined in the dependent claims.

In some embodiments, in order to send information from the OAM to the analytics function, a direct process may be used in which the OAM sends the information directly to the analytics function.

In some embodiments, in order to send information from the OAM to the analytics function, an indirect process may be used, where the analytics function subscribes to receive the information about changes of the NFs/AFs from, for example, a repository, and the OAM updates the repository information.

A first aspect of the application provides a device for providing Control Plane (CP) and/or User Plane (UP) analytics, the device being configured to obtain information related to a resource and/or a change of a resource related to CP and/or UP; perform an analysis based on the obtained information; and generate data based on the analysis.

For example, in some embodiments, the analytics function at the control plane may be enhanced to consume the OAM information on, e.g., the NSI, the NSSI and the NF, as well as, the associated transport network resource models including their information. The information may be related to the physical resources that the NF is running on or the changes thereof and/or the information related to the physical links a Transport Network (TN) link is running on or the changes thereof.

The resource may be a physical resource and/or a virtual resource which may be used for hosting the CP and/or the UP entities, for example, a network function service or a link in the CP or the UP, etc. In some embodiments, a resource interest template may be published that may describe the type of the resources or the changes on such resources that the NWDAF is interested in, for a given NF, link, NSSI, etc.

In an implementation of the first aspect, the device is further configured to obtain the information related to the resource and/or change of the resource from a further entity, in particular a management plane entity.

This is beneficial, because the management plane entity may provide the information which may be related to the change of the resource. Moreover, the device may generate the data (e.g., update the generated data) based on the provided information.

In a further implementation of the first aspect, the resource is related to one or more of:
A Network Slice, in particular a single-network slice selection assistance information (S-NSSAI).
A Network Function (NF).
A Network Slice Instance (NSI).
A Network Slice Subnet Instance (NSSI).
An UP-CP connection.
An UP-UP connection.
A CP-CP connection.
A Transport Network (TN) link, in particular in the CP or UP.

A CP and/or an UP-service.

In a further implementation of the first aspect, the information comprises one or more of:
- A level information of the further entity.
- A physical infrastructure a NF is running on.
- A change in the physical infrastructure a NF is running on.
- A physical link a TN link is running on.
- A change in the physical link a TN link is running on.

In a further implementation of the first aspect, the further entity comprises an Operation, Administration and Management (OAM) entity.

In a further implementation of the first aspect, the device comprising a Network Data Analytics Function (NWDAF) configured to obtain the information related to the resource and/or a change of the resource from the OAM; and in particular adjust the generation of the data for analytics based on the obtained information.

In a further implementation of the first aspect, the NWDAF adjusts the generation of the data for analytics based on one or more of:
- Restarting the generation of the data analytics process.
- Associating the generated data for analytics by an identifier with the resource.

For example, the identifier may be defined as any set of information that may identify a resources, etc.

In a further implementation of the first aspect, the NWDAF is further configured to obtain the information from a third entity, in particular a Network Repository Function, NRF, and in particular request the information related to the resource and/or change of the resource from the NRF.

This is beneficial, since the OAM may, for example, update the NF profile in the NRF. Moreover, the NRF may provide a notification of changes to the NWDAF.

A second aspect of the application provides a method for providing Control Plane (CP) and/or User Plane (UP) analytics, the method comprises obtaining information related to a resource and/or a change of a resource related to CP and/or UP; performing an analysis based on the obtained information; and generating data based on the analysis.

In an implementation of the second aspect, the method further comprises obtaining the information related to the resource and/or change of the resource from a further entity, in particular a management plane entity.

In a further implementation of the second aspect, the resource is related to one or more of:
- A Network Slice, in particular an S-NSSAI.
- A Network Function, NF.
- A Network Slice Instance, NSI.
- A Network Slice Subnet Instance, NSSI.
- An UP-CP connection.
- AN UP-UP connection.
- A CP-CP connection.
- A Transport Network, TN, link, in particular in the CP or UP.
- A CP and/or an UP-service.

In a further implementation of the second aspect, the information comprises one or more of:
- A level information of the further entity.
- A physical infrastructure a NF is running on.
- A change in the physical infrastructure a NF is running on.
- A physical link a TN link is running on.
- A change in the physical link a TN link is running on.

In a further implementation of the second aspect, the further entity comprises an Operation, Administration and Management (OAM) entity.

In a further implementation of the second aspect, the method further comprises obtaining, by a Network Data Analytics Function (NWDAF), the information related to the resource and/or a change of the resource from the OAM; and in particular adjusting the generation of the data for analytics based on the obtained information.

In a further implementation of the second aspect, the NWDAF adjusts the generation of the data for analytics based on one or more of:
- Restarting the generation of the data analytics process.
- Associating the generated data for analytics by an identifier with the resource.

In a further implementation of the second aspect, the method further comprises obtaining, by the NWDAF, the information from a third entity, in particular a Network Repository Function (NRF), and in particular requesting the information related to the resource and/or change of the resource from the NRF.

A third aspect of the application provides a management plane entity, in particular an OAM, configured to provide information related to a resource, wherein the resource is related to a Control Plane (CP) and/or User Plane (UP) to a device for providing analytics.

For example, the OAM may be enhanced to subscribe to an event from a control plane NF (e.g., the analytics function) for information about the resources related to particular NFs, links, NSSI, etc.

Moreover, the OAM may further be enhanced to expose the resources used by each NSI, NSSI, NF or links and/or changes on such resources. For example, in some embodiments, the method for consuming OAM information may be based on obtaining the information directly from the OAM. In some embodiments, the method for consuming OAM information may be based on obtaining the information via another function or data storage configured by the OAM.

In an implementation of the third aspect, the management plane entity is further configured to perform a change in the resource related to the CP and/or UP; and/or provide information related to the change of the resource to the device.

In a further implementation of the third aspect, the management plane entity is further configured to obtain a request information, in particular by subscription and/or a request message from the device for the information related to the resource.

In a further implementation of the third aspect, the management plane entity is further configured to obtain the information related to the resource and/or the change of the resource from a domain management system.

In a further implementation of the third aspect, the domain management system is based on one or more of:
- A TN management system.
- A cloud management system, in particular an NF Virtualization Orchestrator (NFVO).
- A Radio Access Network, RAN, management system.
- An E2E management system.
- A domain management system for a given administrative domain.

For example, the end to end (E2E) may be the E2E management system. The E2E management system may be a management system that manages a collection of domain management systems, in particular a global management system.

In a further implementation of the third aspect, the management plane entity is further configured to abstract the information related to the resource and/or the change of the resource, in particular by removing certain data from the information, before providing it to the analytics device.

For example, in some embodiments, the resource information may belong to the operator, whereas the CP/UP entities and therefore the NWDAF may belong to the vertical. In such a case, the information on resources and their changes exposed to the NWDAF may need to be abstracted from the NWDAF. Moreover, the OAM may notify that the host hosting the CP NF is changed, however, it may not notify how and where the changes occurred.

A fourth aspect of the application provides a method of a management plane entity, in particular an OAM, the method comprising providing information related to a resource, wherein the resource is related to a Control Plane, CP, and/or User Plane, UP, to a device for providing analytics.

In an implementation of the fourth aspect, the method further comprises performing a change in the resource related to the CP and/or UP; and/or provide information related to the change of the resource to the device.

In a further implementation of the fourth aspect, the method further comprises obtaining request information, in particular by subscription and/or a request message from the device for the information related to the resource.

In a further implementation of the fourth aspect, the method further comprises obtaining the information related to the resource and/or the change of the resource from a domain management system.

In a further implementation of the fourth aspect, the domain management system is based on one or more of:
  A TN management system.
  A cloud management system, in particular an NF Virtualization Orchestrator (NFVO).
  A Radio Access Network (RAN) management system.
  An E2E management system.
  A domain management system for a given administrative domain.

In a further implementation of the fourth aspect, the method further comprises abstracting the information related to the resource and/or the change of the resource, in particular by removing certain data from the information, before providing it to the analytics device.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be understood that these methods and functionalities can be implemented in respective software or hardware elements, or any kind of combination thereof.

BRIEF DESCRIPTION OF DRAWINGS

The above described aspects and implementations of the present application will be explained in the following description of specific embodiments in relation to the enclosed drawings, in which FIG. 1 schematically illustrates the device for providing CP/UP analytics, according to various embodiments of the application.

DETAILED DESCRIPTION

Figure 1:
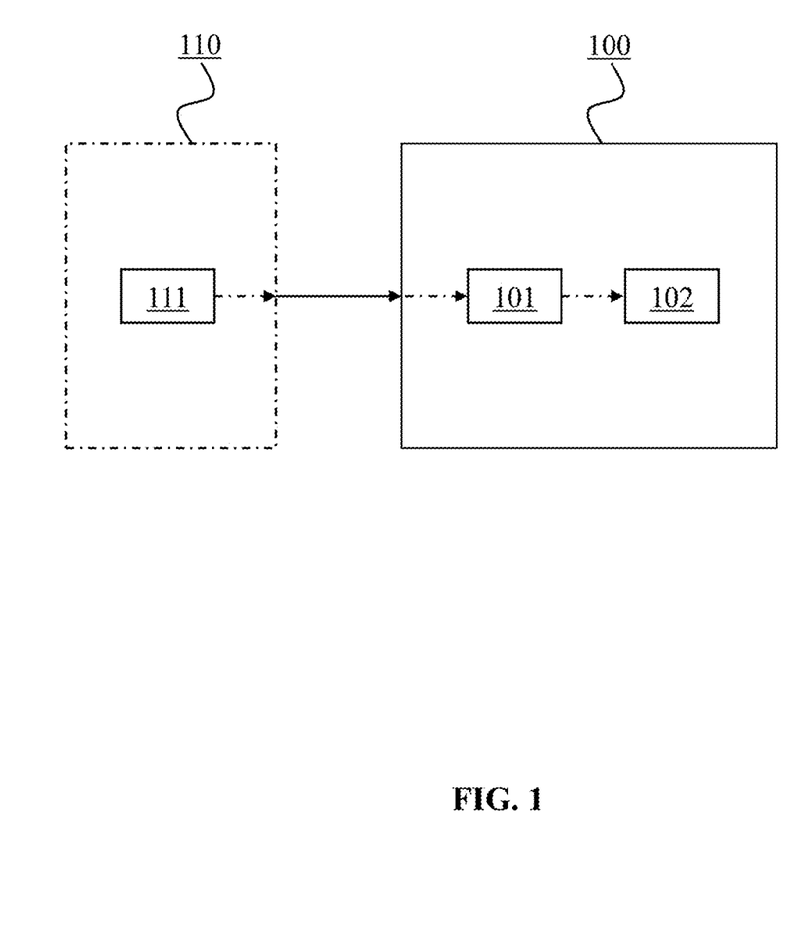

FIG. 1 schematically illustrates a device 100 for providing Control Plane (CP) and/or User Plane (UP) analytics. The device 100 is configured to obtain information 111 related to a resource and/or a change of a resource related to CP and/or UP entities.

The device 100 is further configured to perform an analysis 101 based on the obtained information 111.

The device 100 is further configured to generate data 102 based on the analysis 101.

In some embodiments, an entity such as a management plane entity 110 (e.g., an OAM) may provide information 111 related to a resource, wherein the resource is related to a control plane and/or user plane to the device 100 for providing analytics. For example, the OAM may provide a service notifying changes in the resources used to host the CP/UP entities. Moreover, the NWDAF (e.g., included in the device 100) may actively subscribe to that information where it is authorized to view it.

Figure 2A:
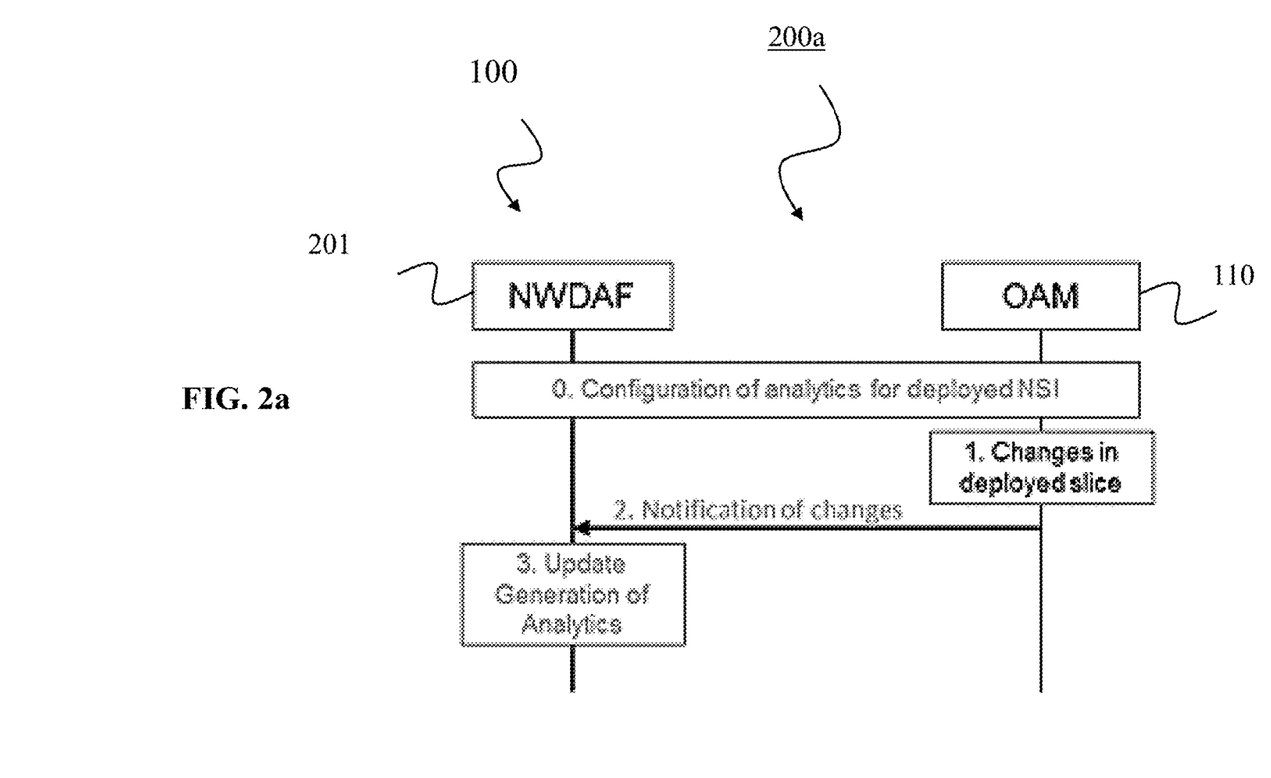
FIG. 2a schematically illustrates an exemplary procedure for obtaining the information related to a resource and/or a change of the resource, according to various embodiments of the application.

FIG. 2a schematically illustrates a flow diagram of an exemplary procedure 200a for obtaining the information related to a resource and/or a change of the resource, according to various embodiments of the application. For example, the OAM 110 may configure the NWDAF 201 to receive this information.

Moreover, the following steps may be performed:
  0. The OAM 110 configures the NWDAF 201 for analysis for the deployed NSI.
  1. The OAM 110 performs changes in the deployed slice.
  2. The OAM 110 send to the NWDAF 201, the notification of changes performed in the deployed slice.
  3. The NWDAF 201 updates the generation of the analytics.

Figure 2B:
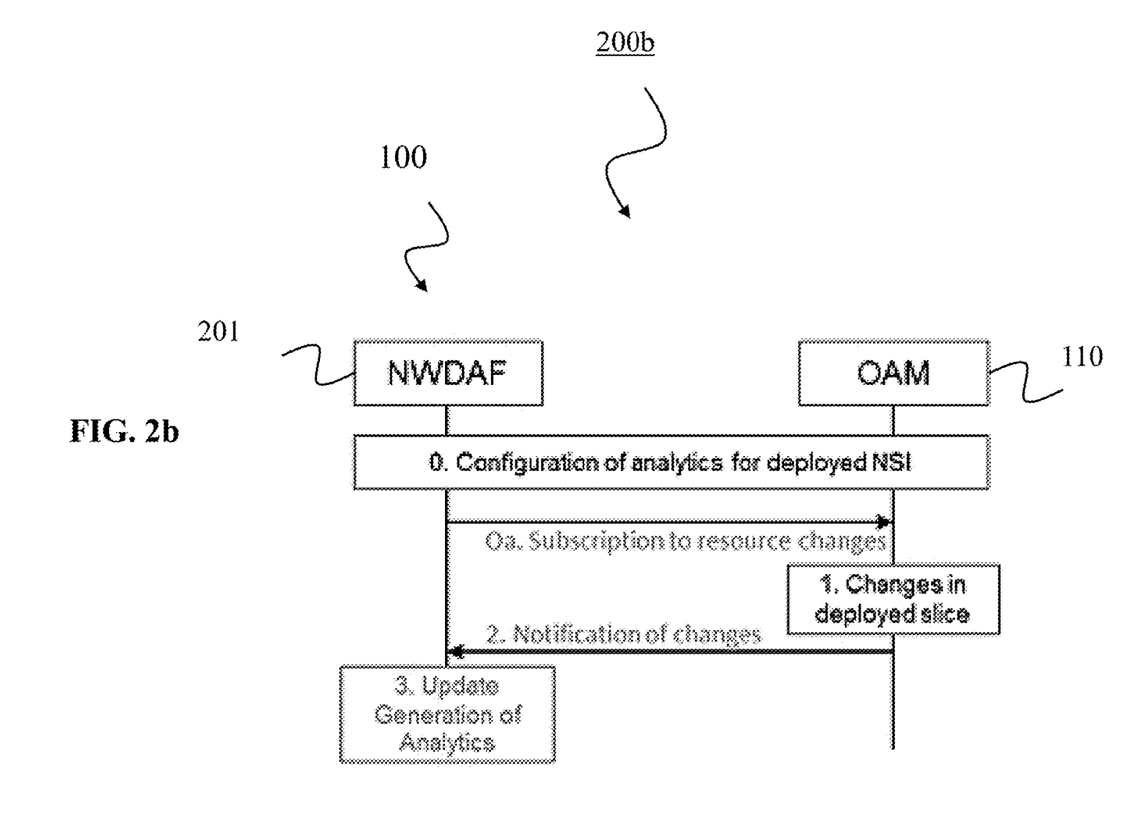
FIG. 2b schematically illustrates an exemplary procedure for obtaining the information by a subscription, according to various embodiments of the application.

FIG. 2b schematically illustrates a flow diagram of an exemplary procedure 200b for obtaining the information by a subscription, according to various embodiments of the application. For example, the NWDAF 201 may actively sign up to the OAM 110, for obtaining the information.

Moreover, the following steps may be performed:
0. The OAM 110 configures the NWDAF 201 for analysis for the deployed NSI.
0a. The NWDAF 201 subscribes to the OAM 110, for the resources changes.
1. The OAM 110 performs changes in the deployed slice.
2. The OAM 110 sends to the NWDAF 201, the notification of changes performed in the deployed slice.
3. The NWDAF 201 updates the generation of the analytics.

In some embodiments, both of the procedures 200a and 200b may be possible together.

The information may include the OAM level information, such as, the physical infrastructure the virtualized NF s/links are hosted on or an indication of changes thereof.

For example, in the current TR23.791 which holds the NF profile, e.g., the NF capacity, the NF load information, the NF status, the NF recovery time, the NF locality. Moreover, in some embodiments of the application, the physical infrastructure (or changes therein) may also be reported to the NWDAF.

Figure 3A:
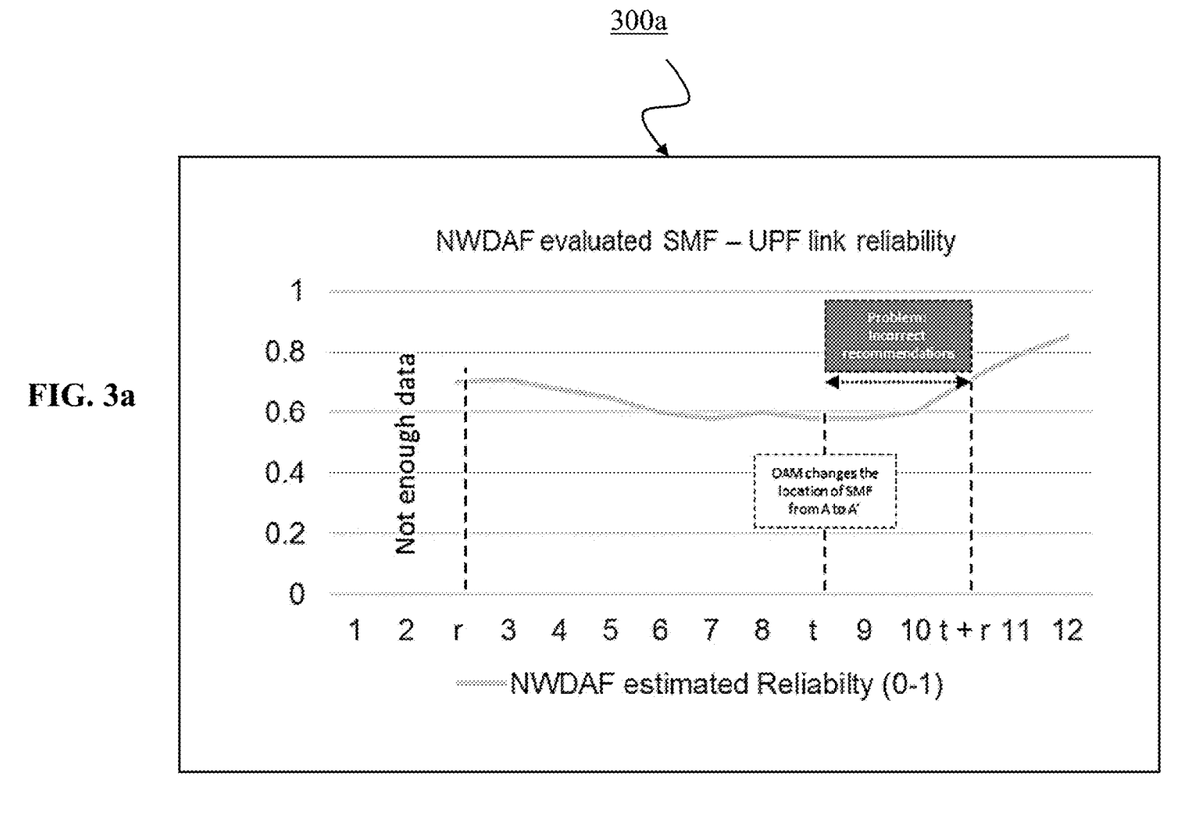
FIG. 3a schematically illustrates an example of changes in the analytics output by the device, without obtaining the information, according to various embodiments of the application.

FIG. 3a illustrates an example of changes in the analytics output 300a by device 100 without obtaining the information of the change of the resource, according to various embodiments of the application.

For example, the information of the resource change is not exposed to the NWDAF from the OAM. Moreover, at the time of the t the OAM changes the location of the SMF from A to A'. Furthermore, at the time between the "t" and "t+r" a problem may occur, for example, the incorrect recommendations may be provided.

Figure 3B:
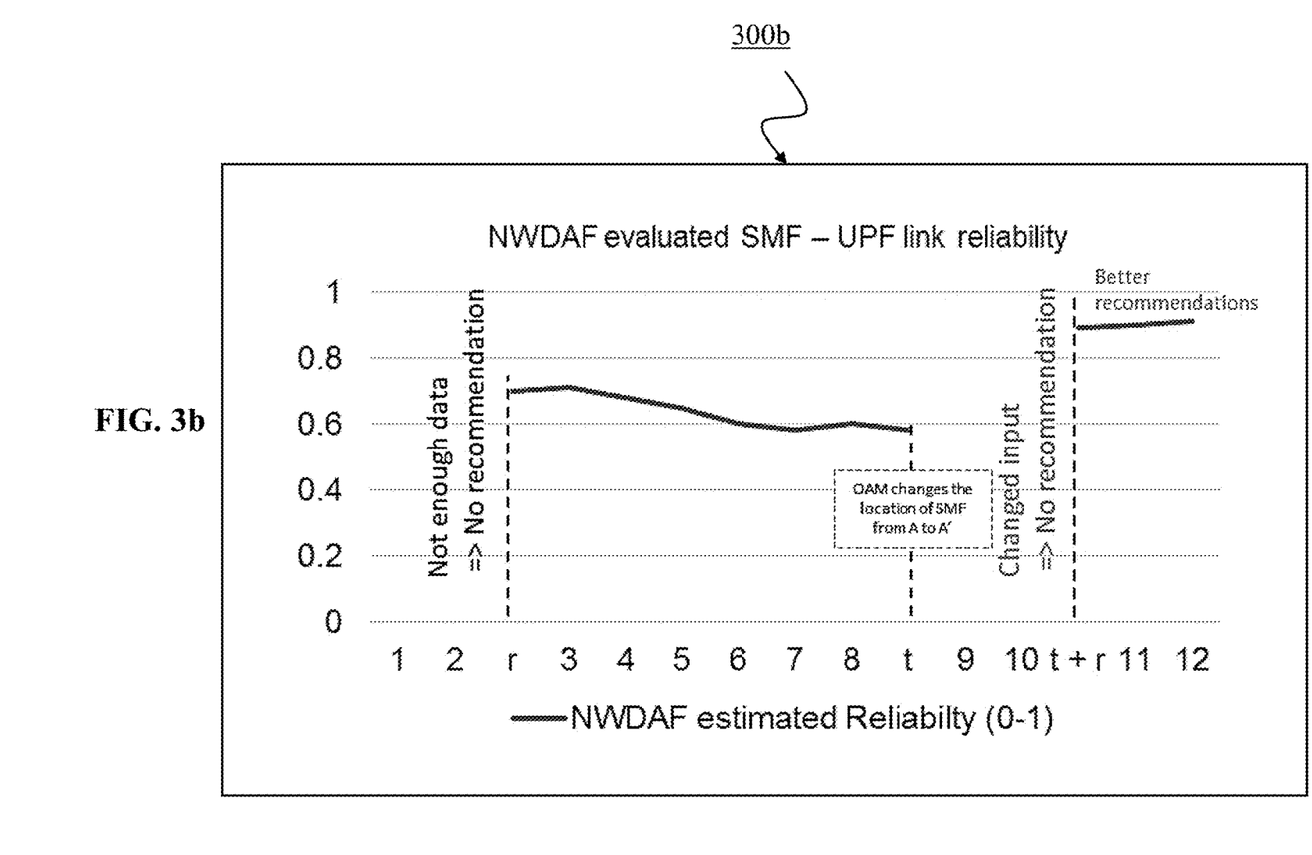
FIG. 3b schematically illustrates an example of changes in the analytics output by the device, with obtaining the information, according to various embodiments of the application.

FIG. 3b illustrates an example of changes in the analytics output 300b by device 100 based on the obtaining the information of the change of the resource, according to various embodiments of the application.

For example, the information may be exposed. Moreover, the effect on the NWDAF analytics may be performed, e.g., the generated data may be updated. For example, at the time of the t the OAM changes the location of the SMF from A to A'. Furthermore, at the time of "t+r" the changed input may be provided (e.g., to the NWDAF). Furthermore, the generated data may be updated and a better recommendation may be provided.

In the following the embodiments of this application are exemplarily described according to the 3GPP 5G Systems based on the Rel. 15, without limiting the application, in which the NWDAF in the 3GPP is enhanced with the analytics function capabilities.

Figure 4:
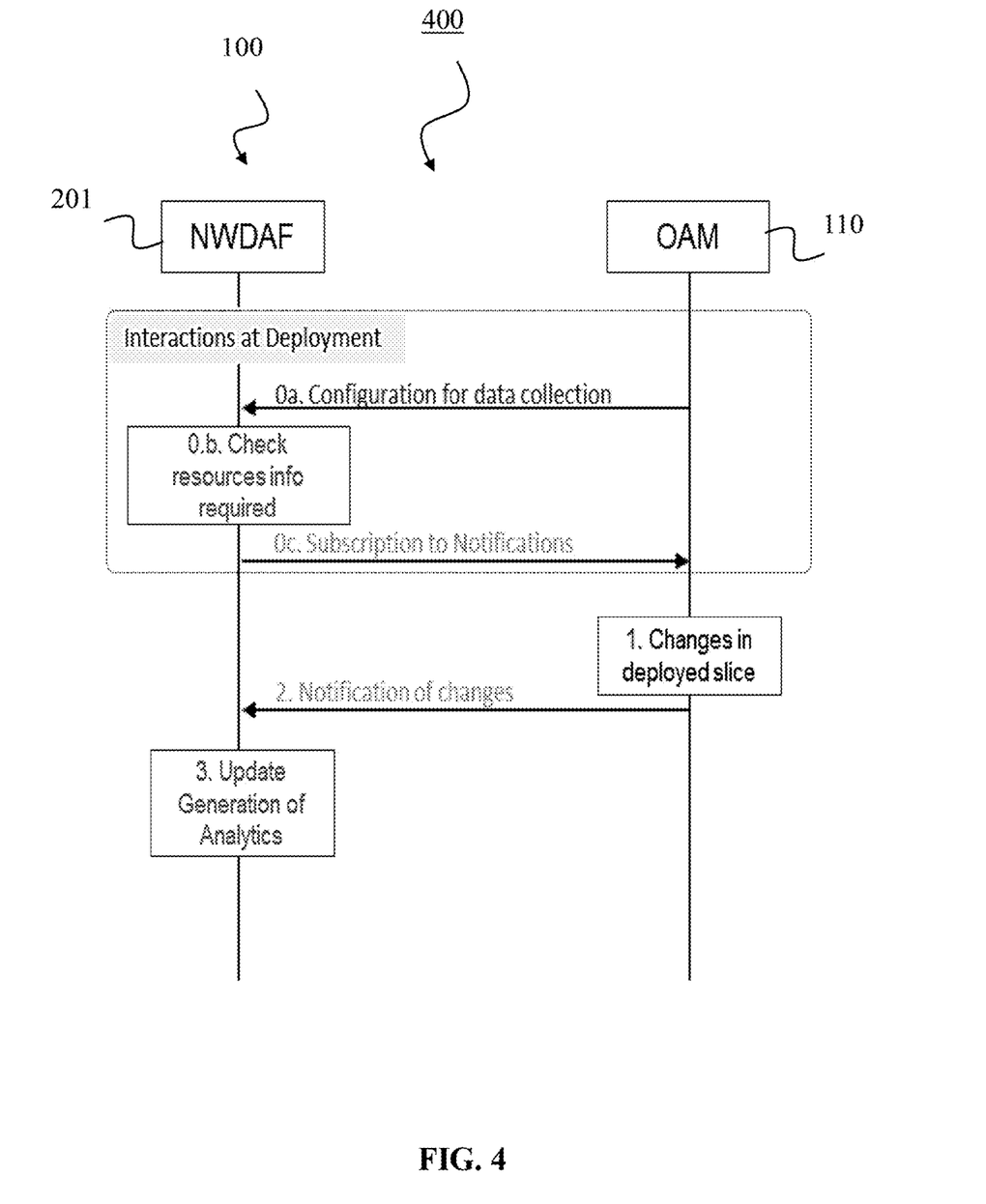
FIG. 4 schematically illustrates a procedure for generating data based on the analysis, according to various embodiments of the application.

FIG. 4 schematically illustrates an exemplary procedure 400 for generating data 102 by directly obtaining the information 111 from the OAM 110, according to various embodiments of the application.

The OAM-NWDAF direct interface may be used and the following steps may be performed:
At 0.a: the OAM 110 configures the NWDAF 201 with the information 111 related to the resources, e.g., for the NWDAF 201 data collection for analytics generation.
At 0.b: the NWDAF 201 checks the resource information for this slice, with the indication of a resource belonging to the entities (for example, the NSI, the NSSI, the NFs, the storage or the links (e.g., including the radio)) that it needs to be aware of them.
At 0.c: the NWDAF 201 subscribes to the OAM 110 services indicating the list of attributes (for example, as specified in the TS 28.532) being associated with the management of the NSIs that it is interested to consume.
At 1: the OAM 110 performs changes in a deployed network slice that affects the attributes NWDAF 201 is subscribed to.
At 2: whenever the OAM 110 performs changes in the NSIs, the NSSIs, the NFs or the links that affect the attributes in which the NWDAF 201 is subscribed to, the OAM 110 notifies the NWDAF 201 of the changed attributes or that fact that it made some, for example, abstracted changes, etc.
At 3: based on the received notification (e.g., obtaining the information 111), the NWDAF 201 adjusts the generation of analytics. For examples, the adjustments may be:
Restarting the analytics process for the affect entities.
In case the resource information or an abstracted identifier is visible to the NWDAF, associating the results from the previous time this combination of resources was used.

Figure 5:
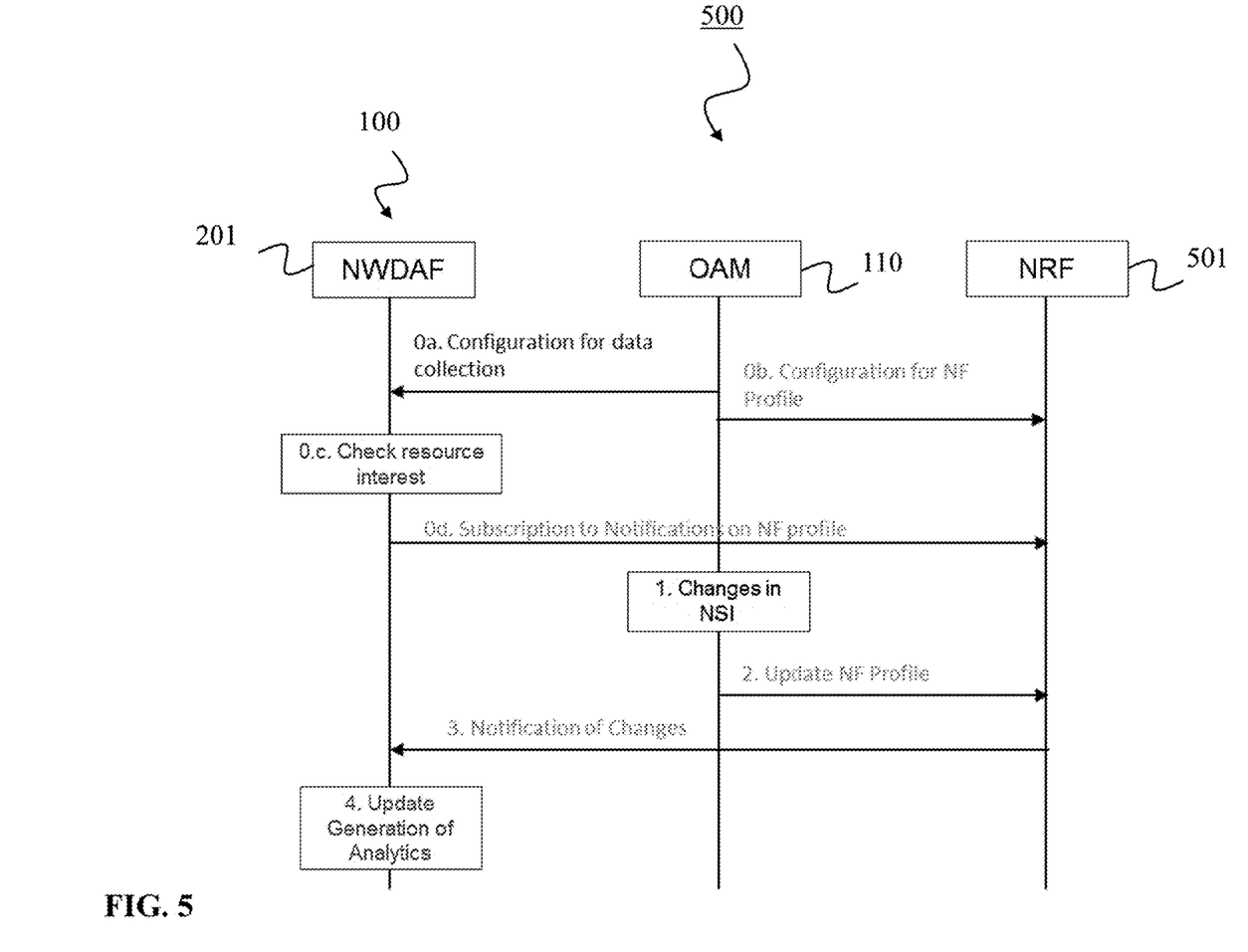
FIG. 5 schematically illustrates an exemplary procedure for generating data by obtaining the information from the third entity, according to various embodiments of the application.

FIG. 5 schematically illustrates an exemplary procedure 500 for generating data 102 by obtaining the information 111 from the third entity 501, according to various embodiments of the application.

The following steps may be performed:
At 0.a: the OAM 110 configures the NWDAF 201 with the information 111 related to the resources for the NWDAF 201 data collection for analytics generation.
At 0.b: the OAM 110 configures the NWDAF 201 with information to support notification of changes in the resources used by the NSI, the NSSI, the NF or the links, e.g., the resource interest list.
At 0.c: the NWDAF 201 checks the resource interest, with the indication of which changes need to be notified per analytics to be generated.
At 0.d: the NWDAF 201 subscribes to another NF, for example, the NRF 501 services in order to receive notifications about changes in the resources.
At 1: the OAM 110 performs changes in a deployed network slice that may affect the attributes that the NWDAF 201 is subscribed to.
At 2: whenever the OAM 110 performs changes in the entities that affect the attributes that the NWDAF 201 is subscribed to, the OAM 110 notifies the NRF 501 of the changed attributes.
At 3: the NRF 501 notifies the NWDAF 201 of changes in the extended NF profile.
At 4: based on the received notification, the NWDAF 201 adjust the generation of the analytics. Examples of adjustments are:
Restarting the analytics process for the affected NFs.
In case the resource details or an abstracted identifier is visible to the NWDAF 201, associating the results from the previous time this combination of the resources was used.

Alternatively, the step 0.b may be omitted and in the step 0.c the NWDAF 201 may evaluate the entity and may further request the resource or change of resource information from the OAM 110, for example, for the specific entities.

In some embodiments, a service based architecture may be used. Moreover, the following steps may be performed.

The OAM 110 has a service that notifies the changes in the resource usage for a given network slice.
a. It may be called as "ResourceChangeNotificationService".
b. The NWDAF 201 subscribes to this service for a given list of entities.

c. The OAM 110 (or the service bus) verifies that the NWDAF is eligible to receive this information.

i. The information 111 may be eligible at different abstraction levels.

d. The OAM 110 performs a change in a particular hosted resource.

e. The "ResourceChangeNotificationService" generates a notify event, for example, over the service bus.

f. The NWDAF 201 may receive the notification and may re-evaluate its analytics recommendations.

In some embodiments, a service based architecture may be used. Moreover, the following steps may be performed. Alternatively, there may be a data Storage and/or a streaming service that both the OAM and the NWDAF are subscribed to.

a. The OAM 110 may publish resource change events to this service.

b. The NWDAF 201 may subscribe to these events in the data storage service.

Figure 6:
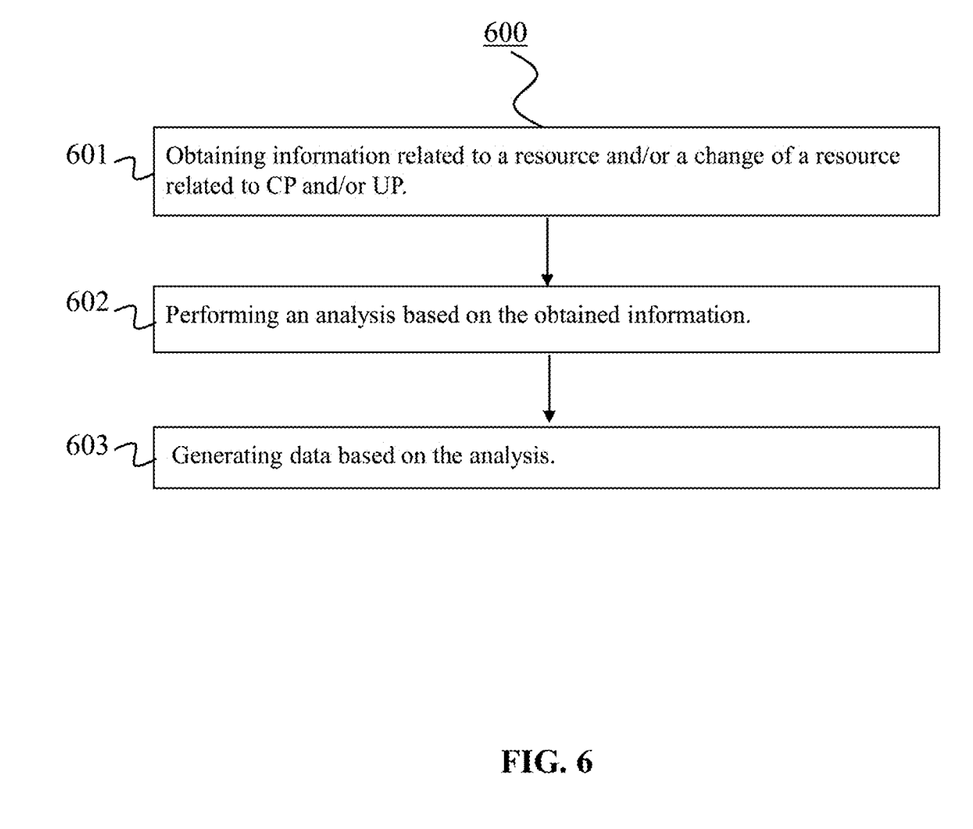
FIG. 6 schematically illustrates a method for providing Control Plane, CP, and/or User Plane, UP, analytics, according to various embodiments of the application.

FIG. 6 shows a method 600 according to an embodiment of the application for providing Control Plane, CP, and/or User Plane, UP, analytics. The method 600 may be carried out by the device 100, as is described above.

The method 600 comprises a step 601 of obtaining information 111 related to a resource and/or a change of a resource related to CP and/or UP.

The method 600 further comprises a step 602 of performing an analysis 101 based on the obtained information 111.

The method 600 further comprises a step 603 of generating data 102 based on the analysis 101.

Figure 7:
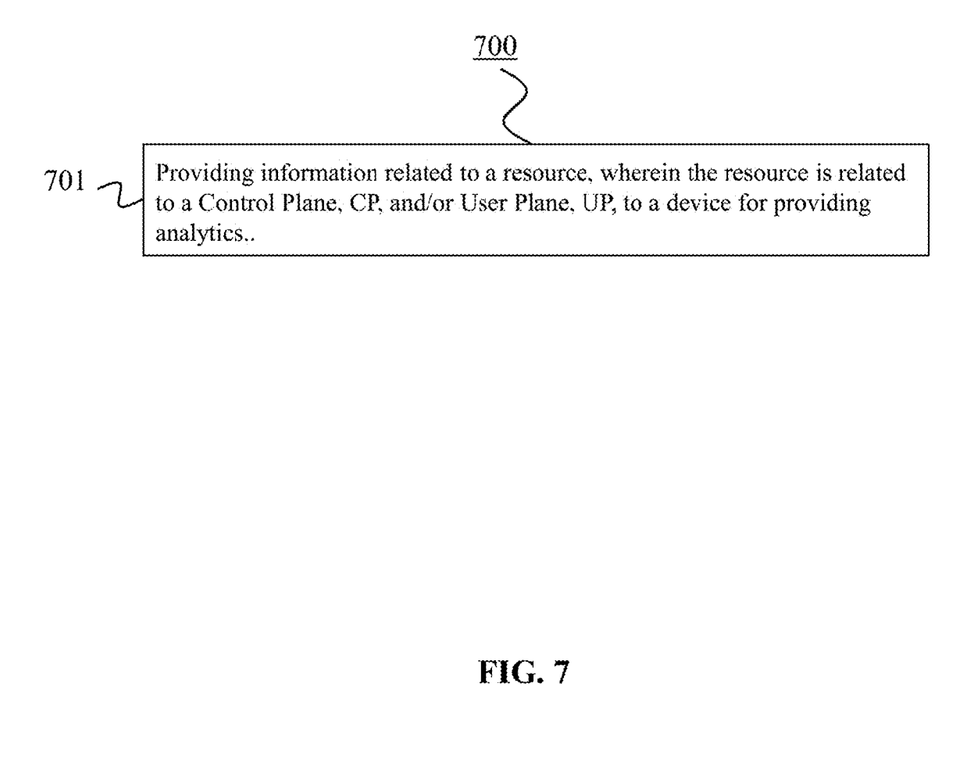
FIG. 7 schematically illustrates a method of a management plane entity, according to various embodiments of the application.

FIG. 7 shows a method 700 of a management plane entity 110, in particular an OAM. The method 700 may be carried out by the device 110, as it described above.

The method 700 comprises a step 701 of providing information 111 related to a resource, wherein the resource is related to a Control Plane, CP, and/or User Plane, UP, to a device 100 for providing analytics.

The present application has been described in conjunction with various embodiments as examples as well as implementations. However, other variations can be understood and practiced based on the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for providing at least one of a control plane (CP) and a user plane (UP) analytics, the device having a network data analytics function (NWDAF) and comprising:
a processor; and
a non-transitory memory storing instructions, that when executed by the processor, cause the device to perform steps comprising:
obtaining, by the NWDAF, information related to a resource related to at least one of the CP and the UP, from an operation administration and management (OAM) entity;
performing an analysis based on the obtained information;
generating data based on the analysis;
obtaining, by the NWDAF, updated information related to a change of the resource related to at least one of the CP and the UP, from the OAM entity; and
adjusting, by the NWDAF, the generation of the data for analytics based on the obtained updated information.

2. The device according to claim 1, wherein the resource is related to at least one of:
a network slice, the network slice comprising a single-network slice selection assistance information (S-NSSAI);
a network function (NF);
a network slice instance (NSI);
a network slice subnet instance (NSSI);
a UP-CP connection;
a UP-UP connection;
a CP-CP connection;
a transport network (TN) link, the TN link being in the CP or the UP; or
at least one of a CP and a UP-service.

3. The device according to claim 1, wherein the information comprises at least one of:
a level information of a further entity;
a physical infrastructure which a network function (NF) is running on;
a change in the physical infrastructure which the NF is running on;
a physical link which a transport network (TN) link is running on; or
a change in the physical link which the TN link is running on.

4. The device according to claim 1, wherein the NWDAF adjusts the generation of the data for analytics based on at least one of:
restarting the generation of the data analytics process; or
associating the generated data for analytics by an identifier with the resource.

5. The device according to claim 1, the steps further comprising:
obtaining the information and the updated information from a third entity, the third entity comprising a network repository function (NRF); and
requesting the information related to the resource and the updated information related to the change of the resource from the NRF.

6. A management plane entity, the management plane entity comprising an operation, administration and management (OAM);
a processor; and
a non-transitory memory storing instructions, that when executed by the processor, cause the entity to perform steps comprising:
obtaining information related to a resource related to at least one of a control plane (CP) or a user plane (UP) from a domain management system;
performing a change in the resource related to at least one of the CP or the UP;
providing, from the OAM, the information related to the resource to a device for providing analytics; and
providing, from the OAM, updated information related to the change in the resource to the device.

7. The management plane entity according to claim 6, the steps further comprising:
obtaining a request information by at least one of a subscription and a request message from the device for the information related to the resource.

8. The management plane entity according to the claim 6, the steps further comprising:
obtaining the information related to the resource and the updated information related to the change in the resource from a domain management system.

9. The management plane entity according to claim 8, wherein
the domain management system is based on at least one of:
a transport network (TN) management system;
a cloud management system, the cloud management system comprising a network function virtualization orchestrator (NFVO);
a radio access network (RAN) management system;
an end-to-end (E2E) management system; or
a domain management system for a given administrative domain.

10. The management plane entity according to the claim 6, the steps further comprising:
abstracting the information related to the resource and the information related to the change in the resource by removing certain data from the information and the updated information before providing the information and the updated information to the device.

11. A method for providing at least one of a control plane (CP) and a user plane (UP) analytics, the method comprising:
obtaining, by a network data analytics function (NWDAF) information related to a resource related to at least one of the CP and the UP, from an operation administration and management (OAM) entity;
performing an analysis based on the obtained information;
generating data based on the analysis;
obtaining, by the NWDAF, updated information related to a change of the resource related to at least one of the CP and the UP, from the OAM entity; and
adjusting, by the NWDAF, the generation of the data for analytics based on the obtained updated information.

12. A method for a management plane entity, the management plane entity comprising an operation, administration and management (OAM), the method comprising:
obtaining information related to a resource related to at least one of a control plane (CP) or a user plane (UP) from a domain management system;
performing a change in the resource related to at least one of the CP or the UP;
providing, from the OAM, the information related to the resource to a device for providing analytics; and
providing, from the OAM, updated information related to the change in the resource to the device.

* * * * *